Sept. 23, 1947.　　A. G. FORSYTH　　2,427,845
PERIODICALLY ACTUATED JET MOTOR
Filed April 2, 1942　　18 Sheets-Sheet 1
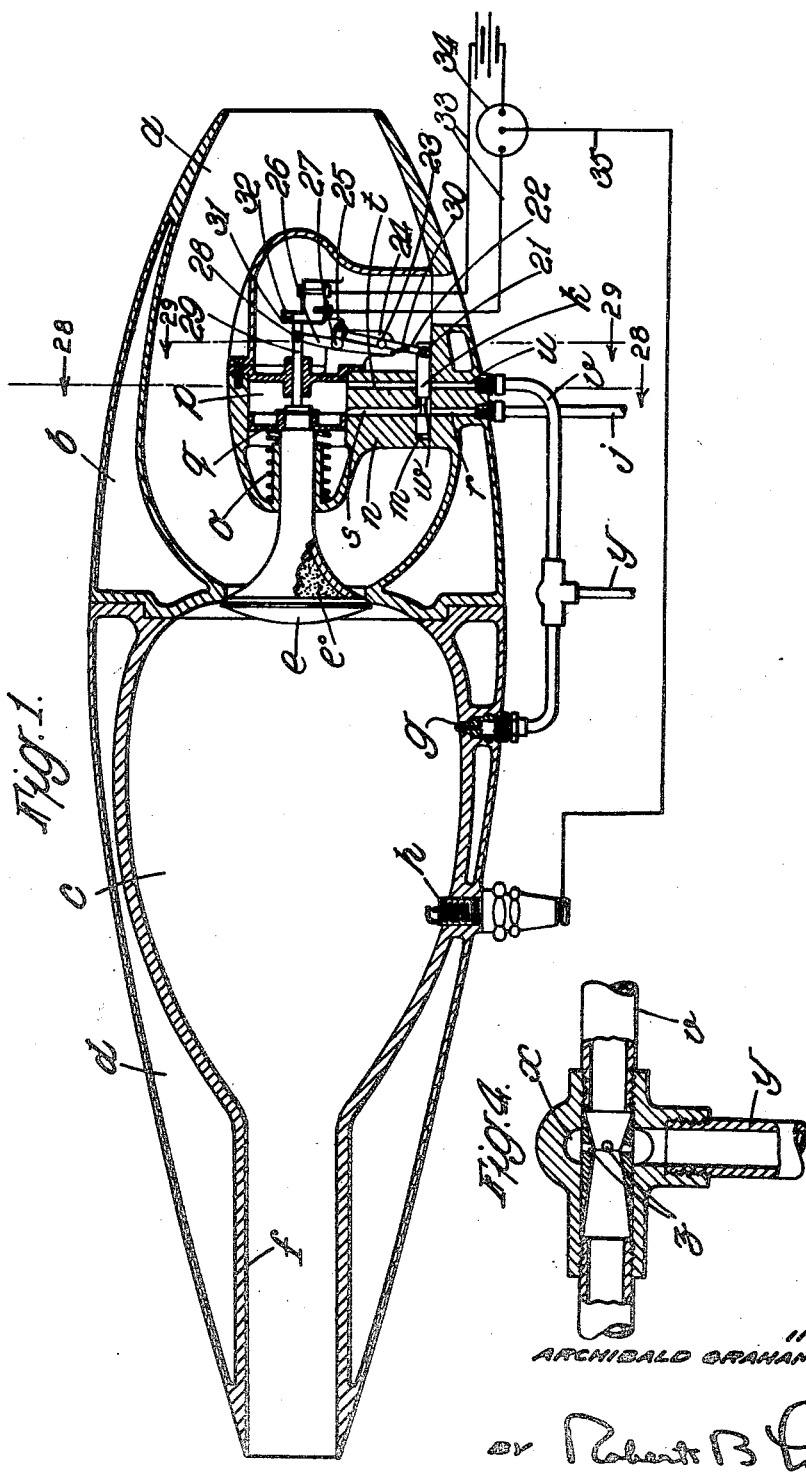
INVENTOR
ARCHIBALD GRAHAM FORSYTH,
BY Robert B. Inaman
ATTORNEY

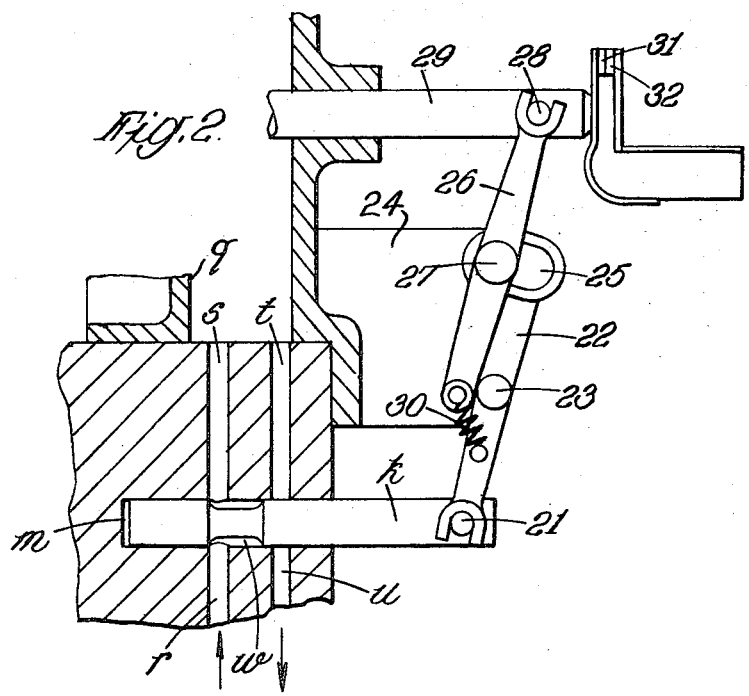
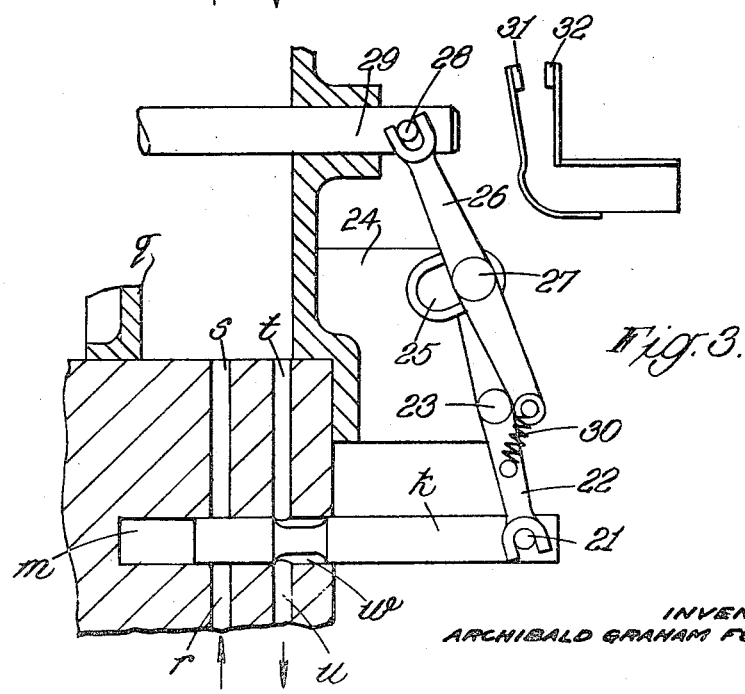

INVENTOR
ARCHIBALD GRAHAM FORSYTH,
BY Robert B. Pearson
ATTORNEY

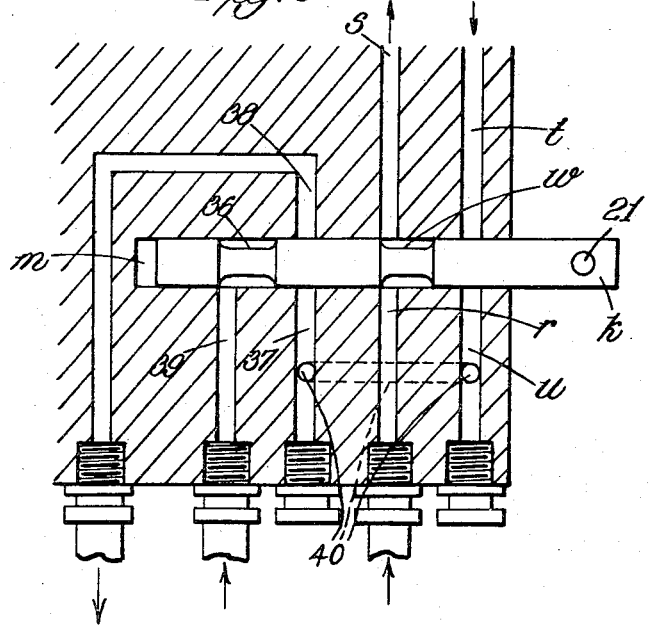
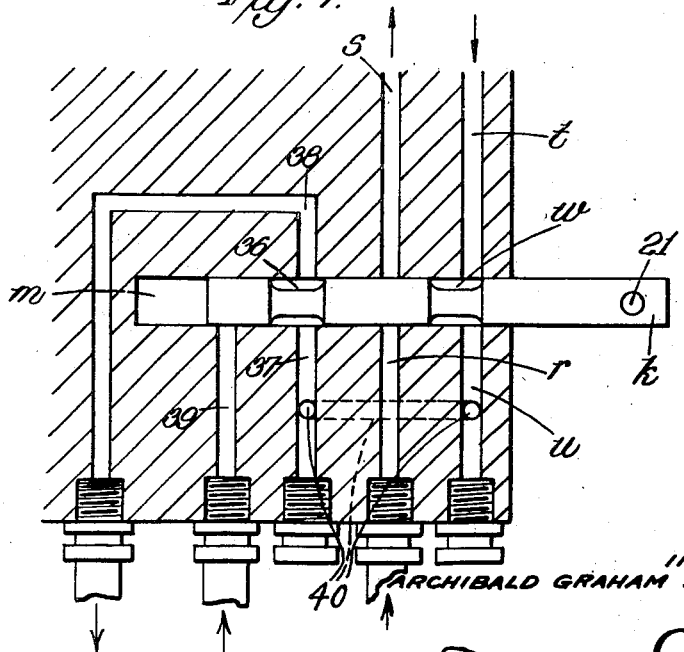

Sept. 23, 1947.  A. G. FORSYTH  2,427,845
PERIODICALLY ACTUATED JET MOTOR
Filed April 2, 1942   18 Sheets-Sheet 5

INVENTOR
ARCHIBALD GRAHAM FORSYTH,
BY Robert B Pearson
ATTORNEY

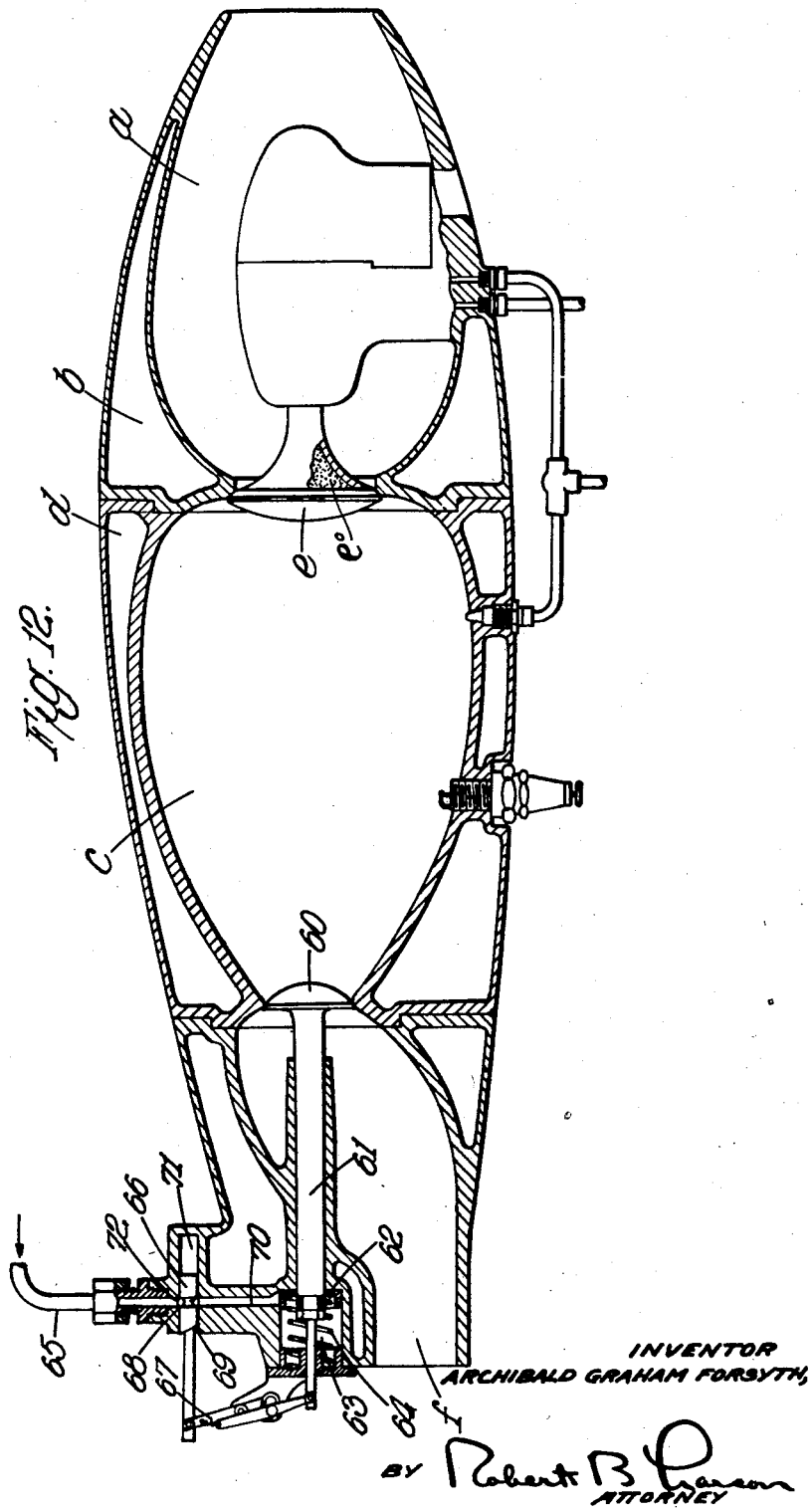

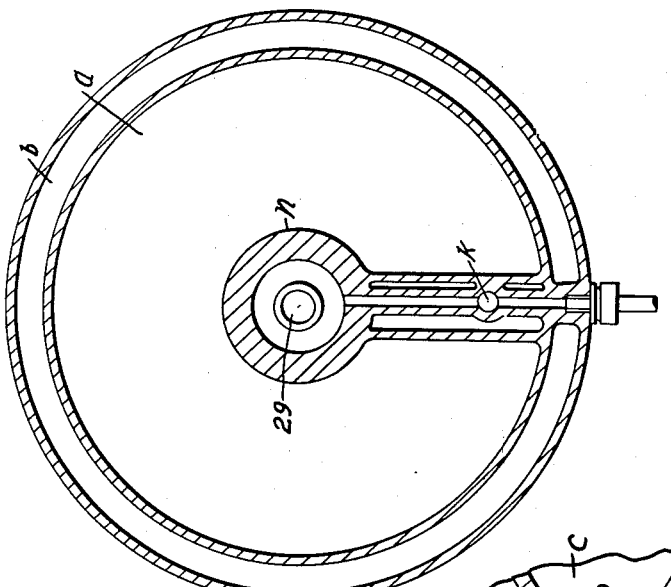
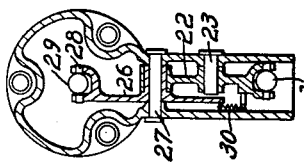
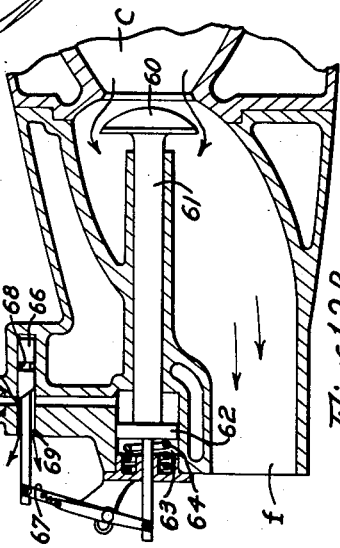
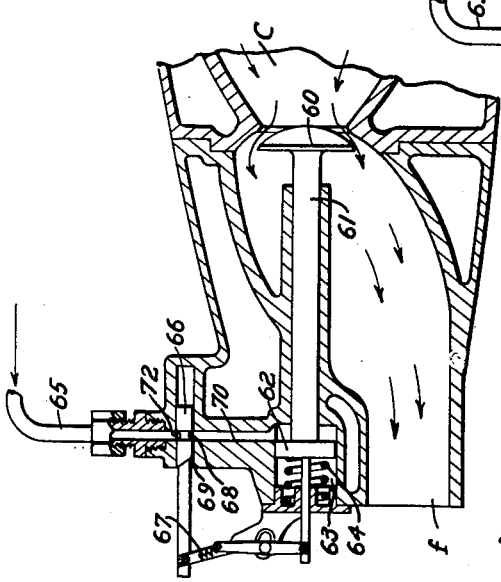

Sept. 23, 1947.  A. G. FORSYTH  2,427,845
PERIODICALLY ACTUATED JET MOTOR
Filed April 2, 1942  18 Sheets-Sheet 9
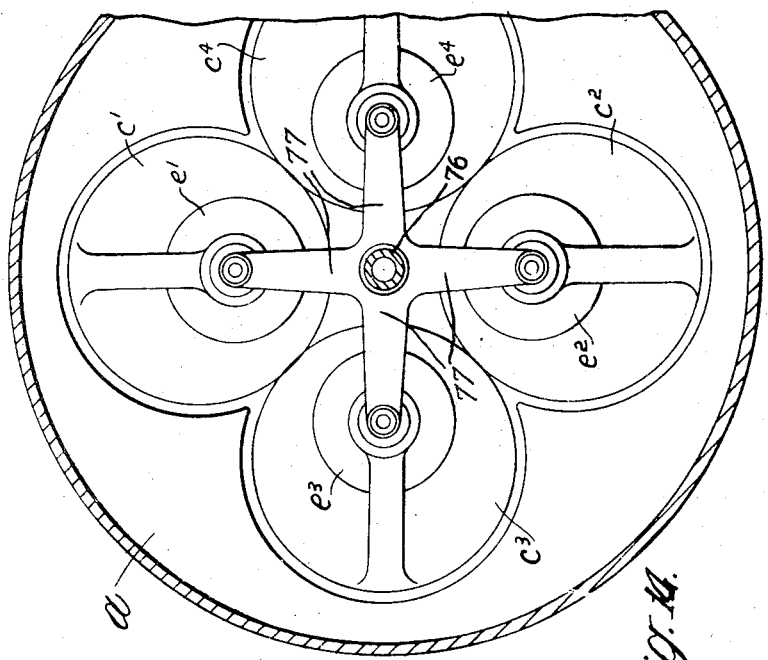
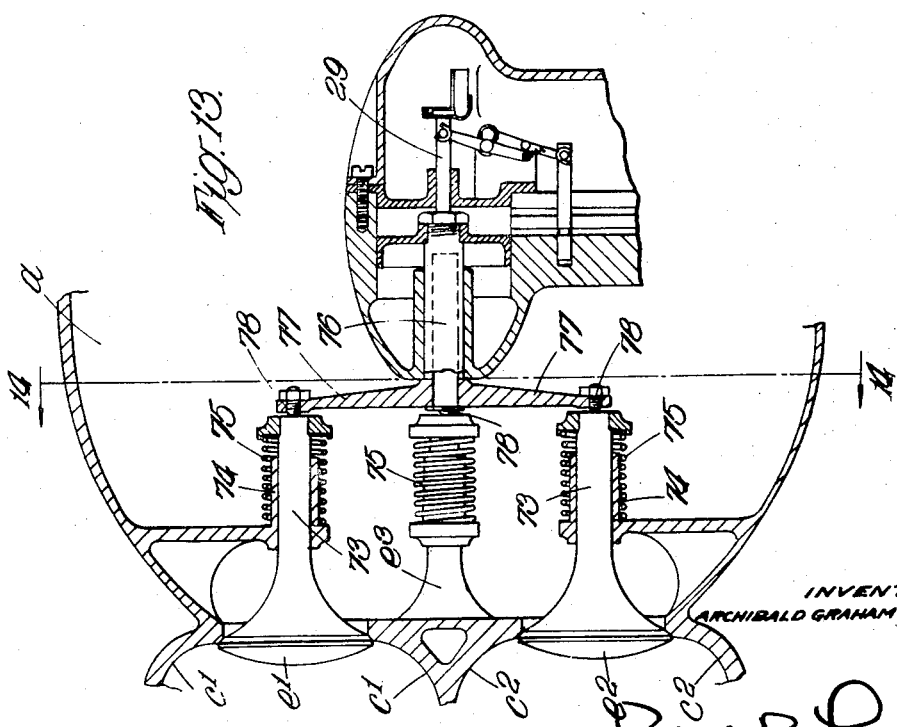
INVENTOR
ARCHIBALD GRAHAM FORSYTH,
BY Robert B. Larson
ATTORNEY

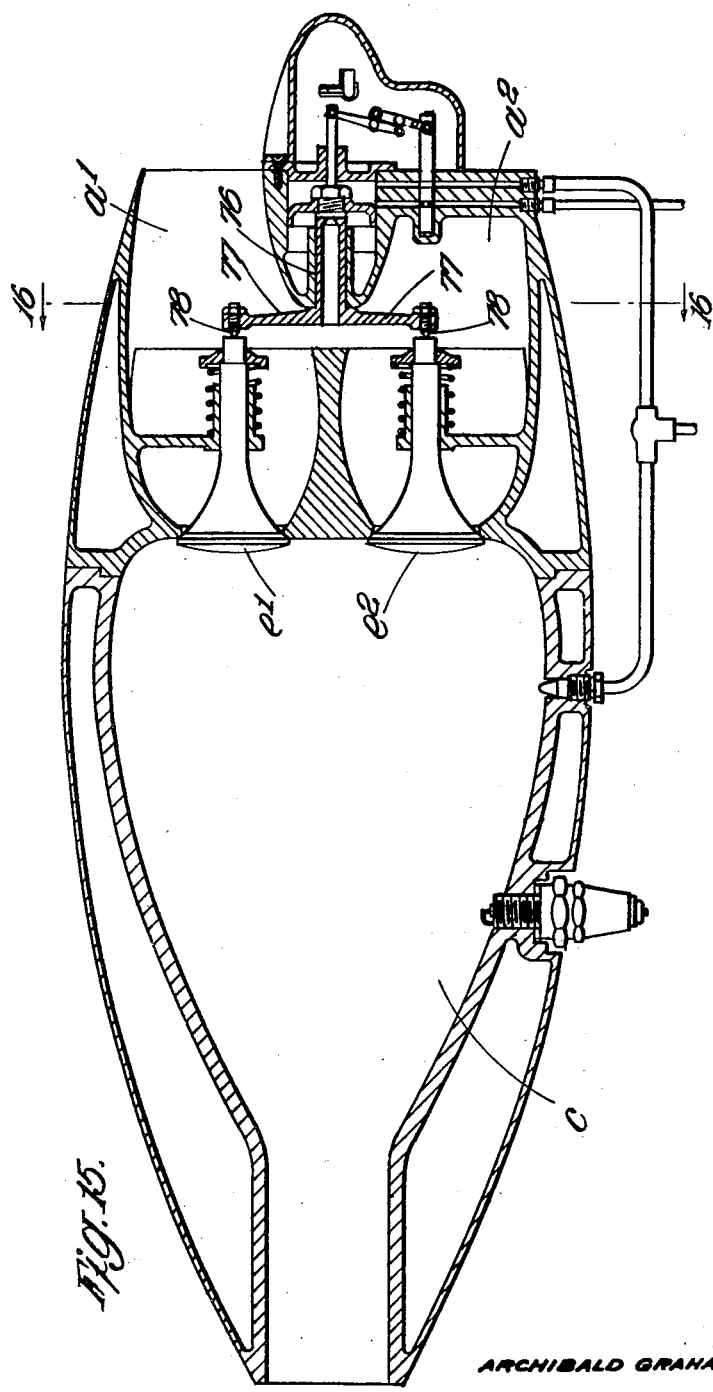

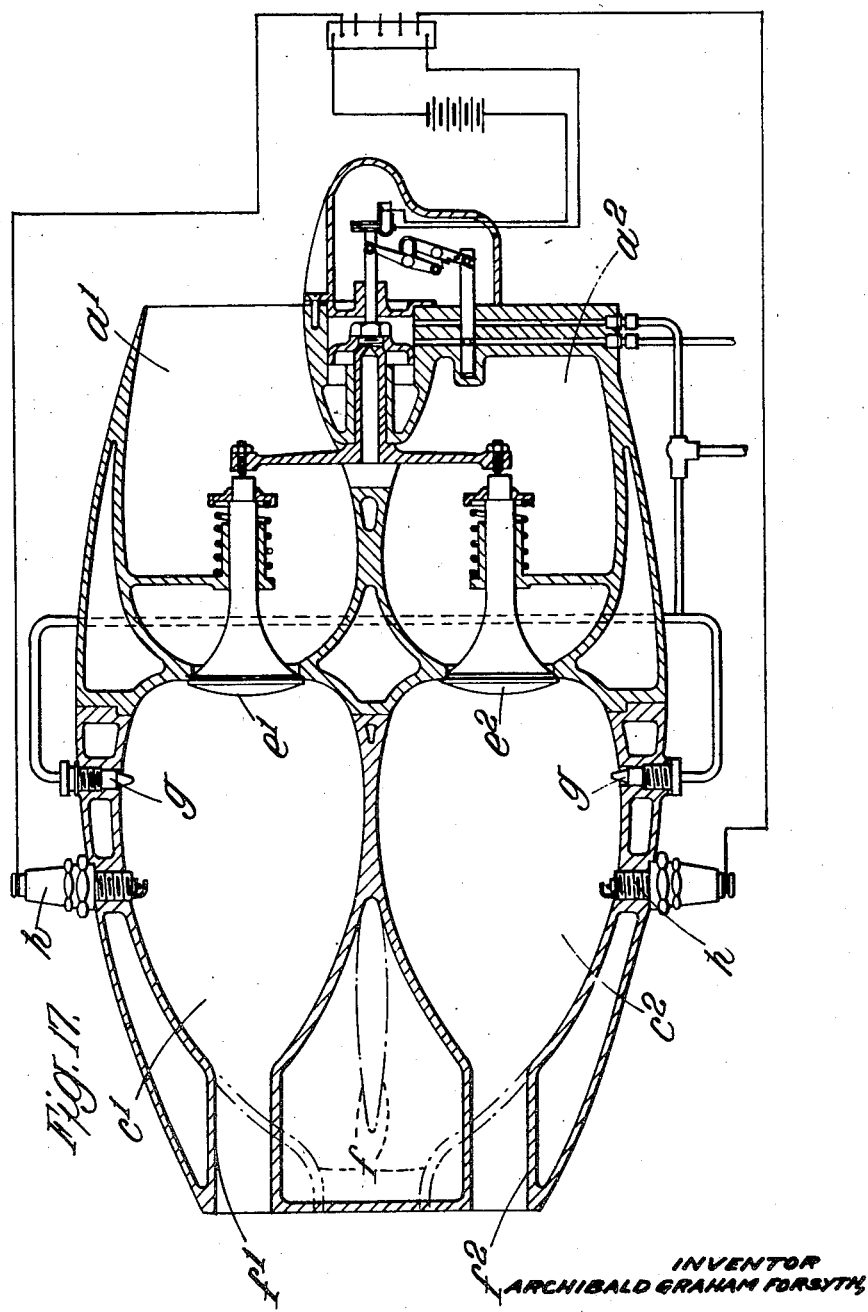

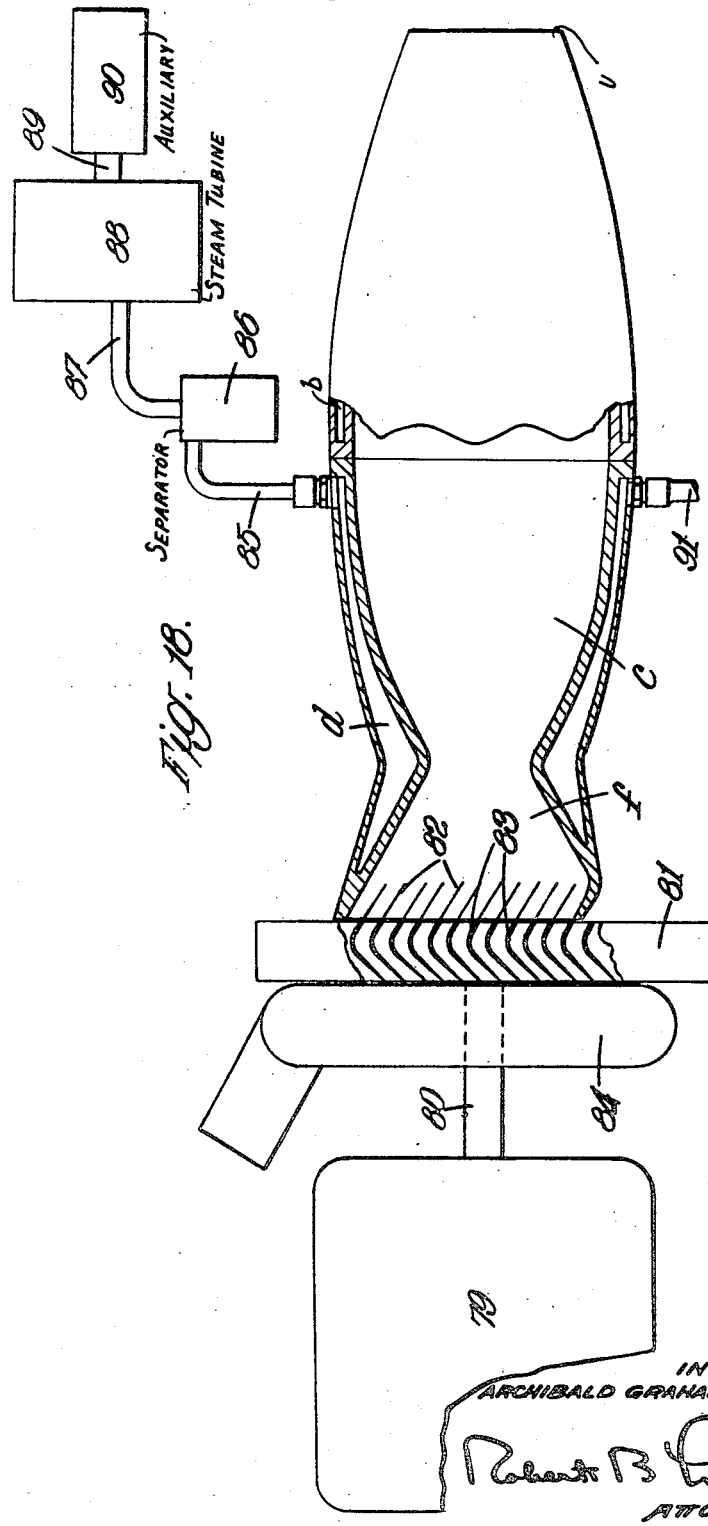

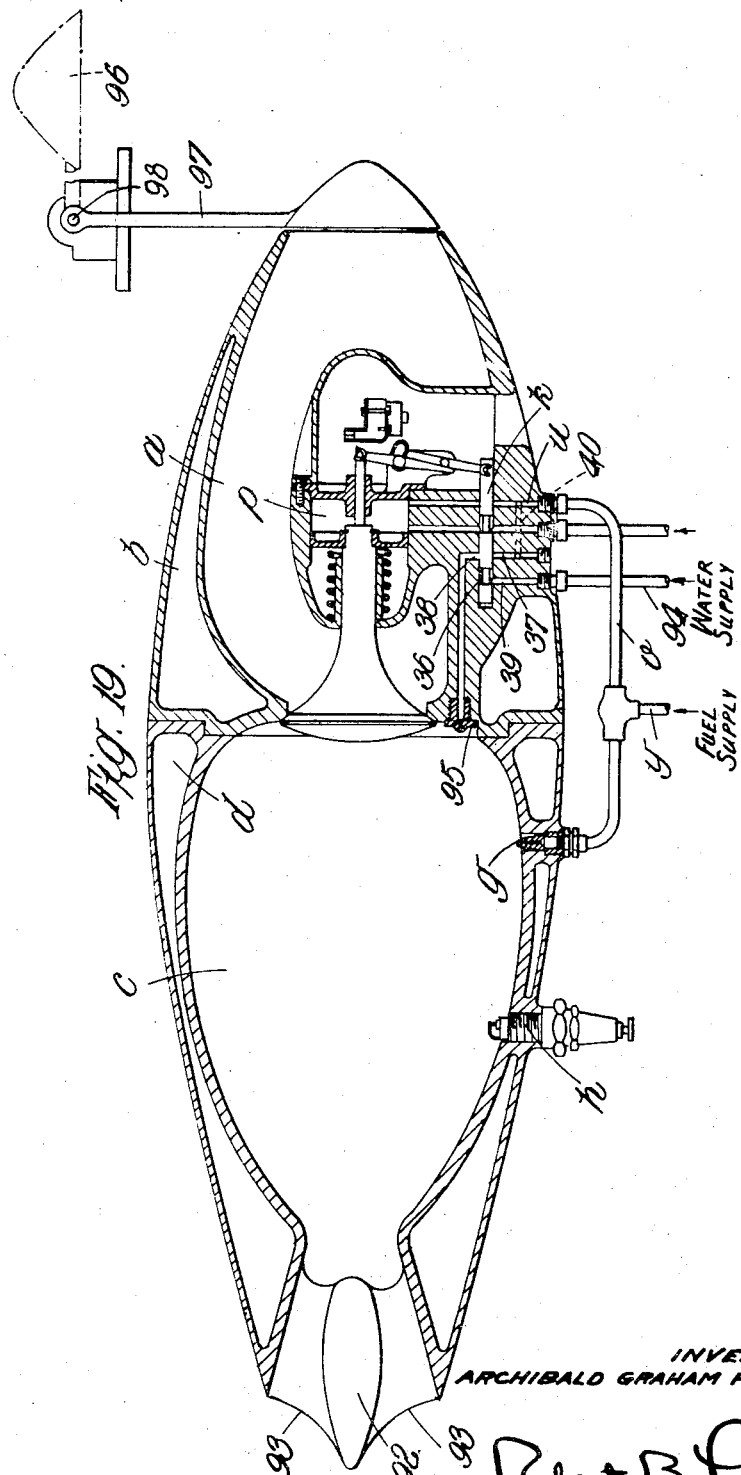

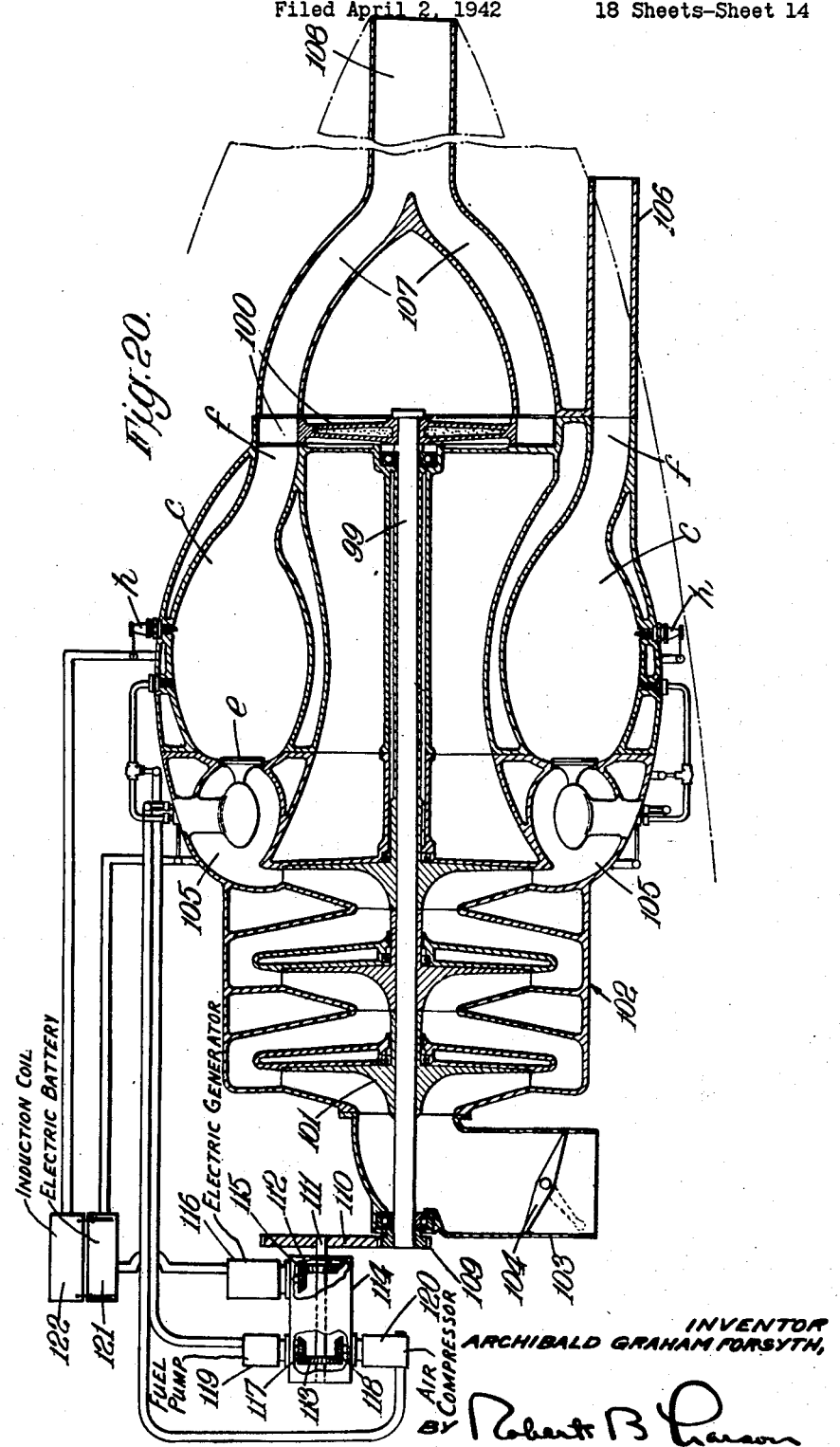

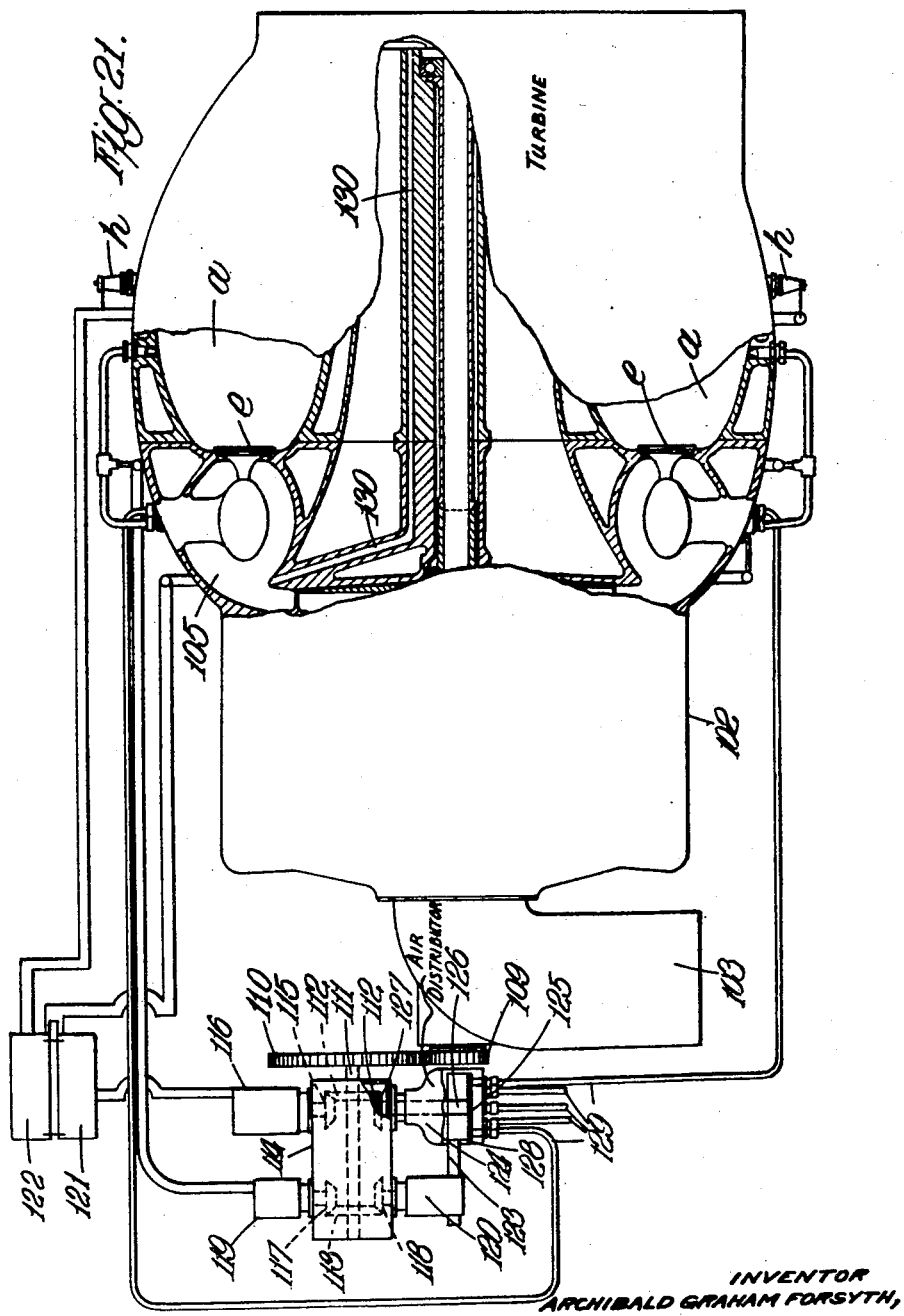

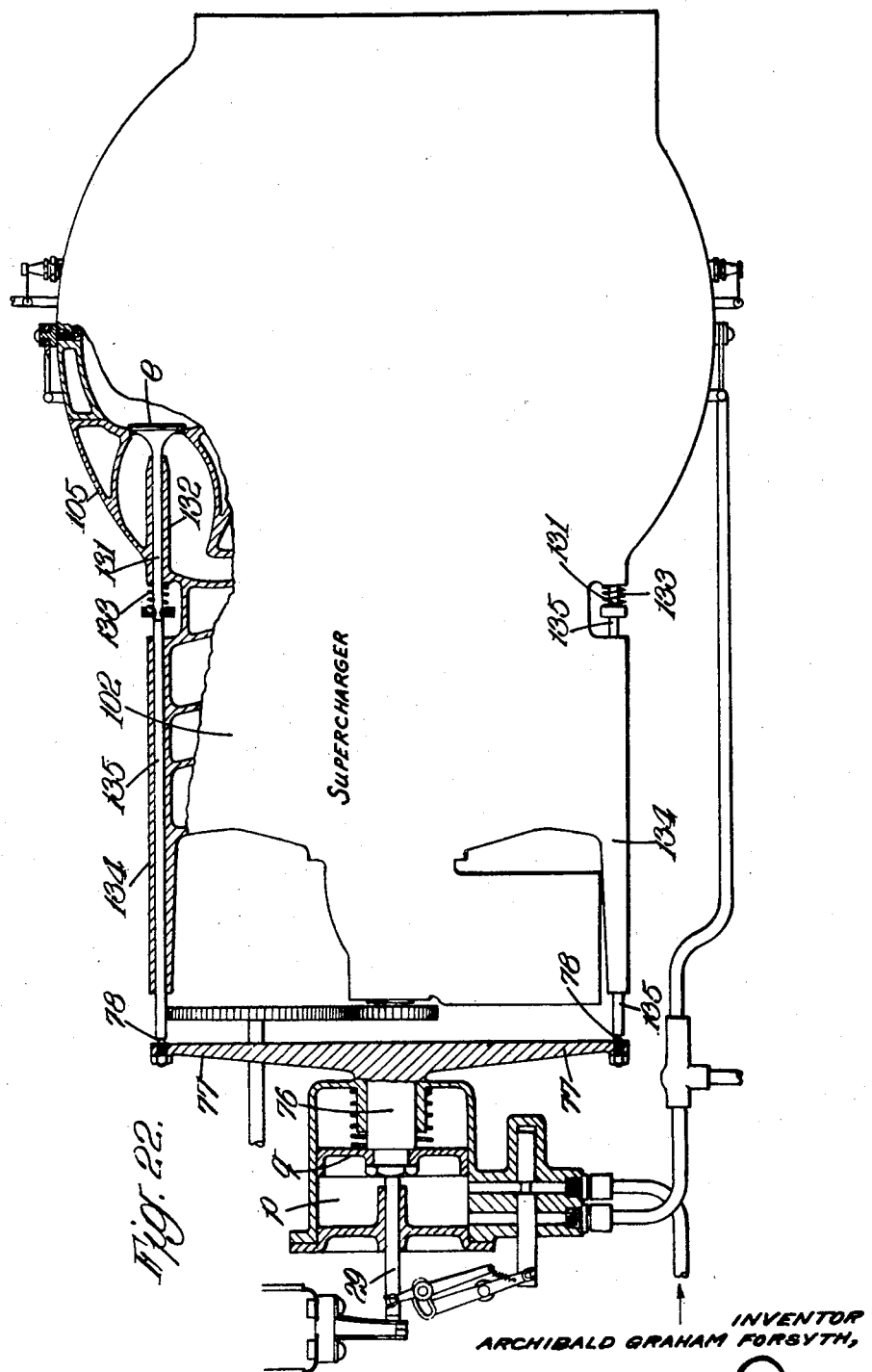

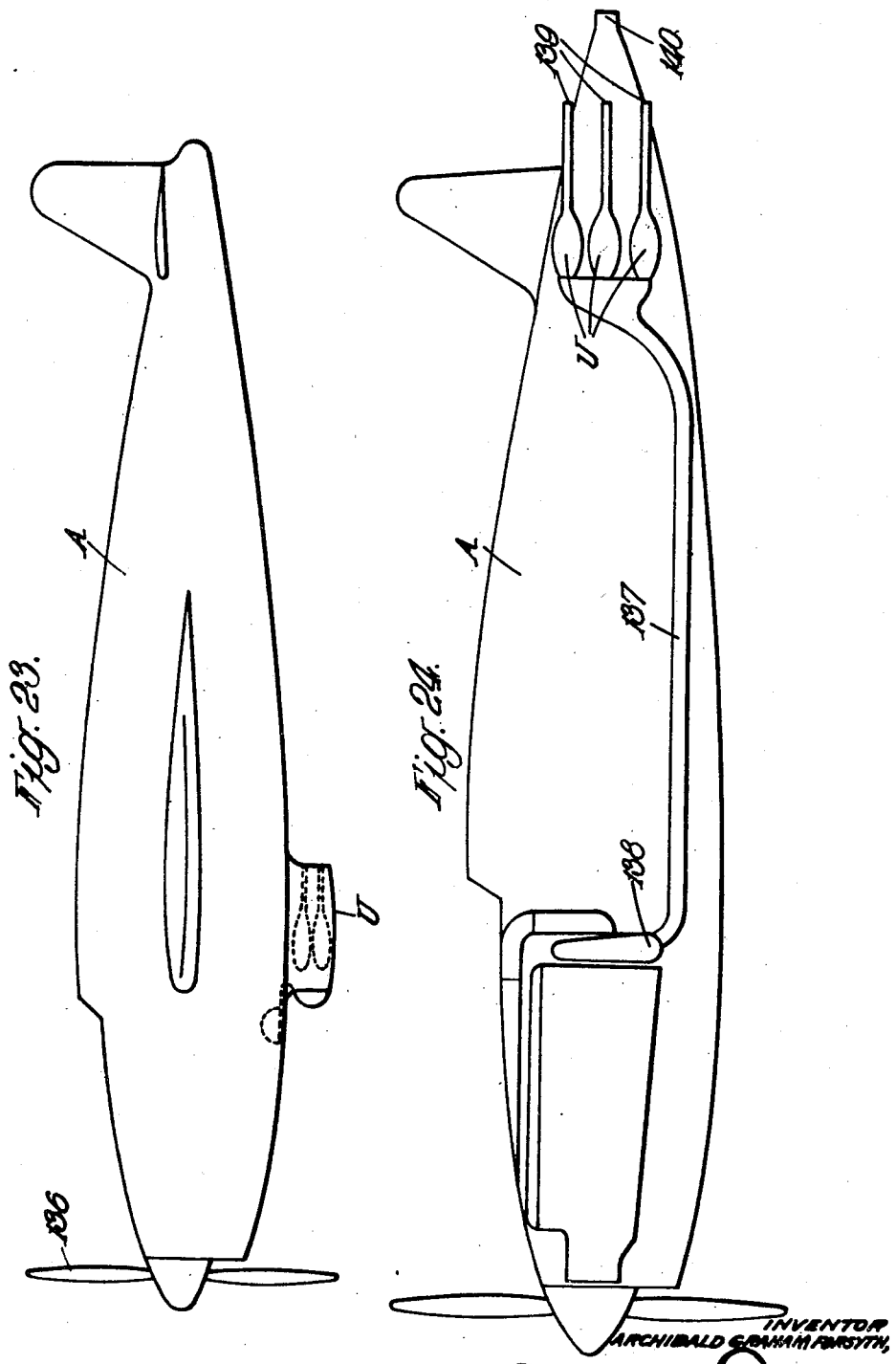

Sept. 23, 1947.  A. G. FORSYTH  2,427,845
PERIODICALLY ACTUATED JET MOTOR
Filed April 2, 1942   18 Sheets-Sheet 18
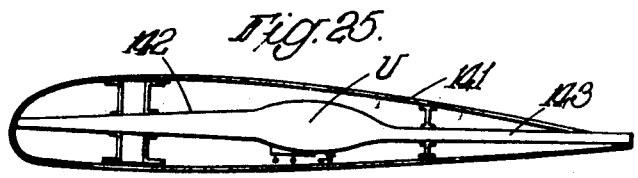
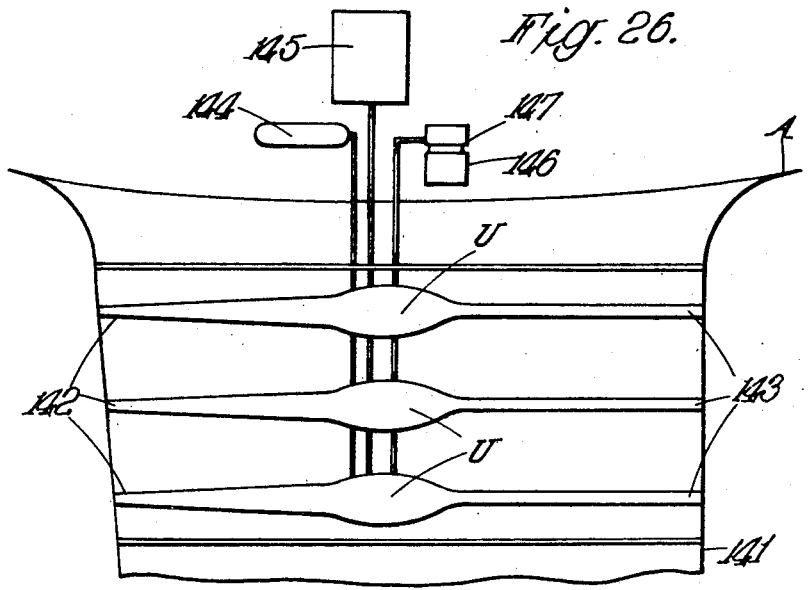
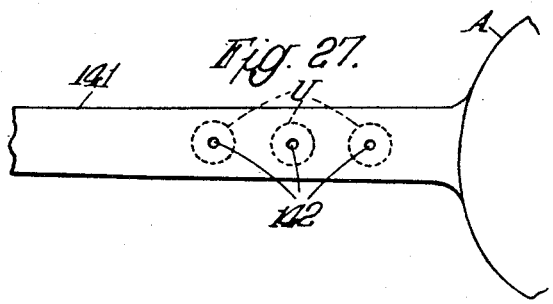
INVENTOR
ARCHIBALD GRAHAM FORSYTH,
BY Robert B Larson
ATTORNEY Patented Sept. 23, 1947

2,427,845

UNITED STATES PATENT OFFICE 2,427,845

PERIODICALLY ACTUATED JET MOTOR

Archibald Graham Forsyth, Cheam, England, assignor to The Fairey Aviation Company Limited, Hayes, Middlesex, England Application April 2, 1942, Serial No. 437,429
In Great Britain July 8, 1941

12 Claims. (Cl. 60—35.6)

It is known to use the exhaust from internal combustion engines for assisting the propulsion of aircraft by ejection and to operate superchargers and compressors by means of exhaust driven turbines. The present invention has for its object improved means for utilizing by the ejection method the force generated by explosion for the purpose of propelling aircraft and other vehicles, and if desired, for operating auxiliaries thereon such as electric generators, air compressors, fuel pumps and so on.

More specifically, this invention relates to internal combustion devices of the type described above and which incorporates novel means for feeding the explosive gases into the explosion chamber.

A further object of this invention is to provide novel means for controlling the flow of combustible gases.

A still further object of this invention is to provide a device of the type described which will be simple to construct yet strong and durable so as to serve the purpose intended.

Figure 5:
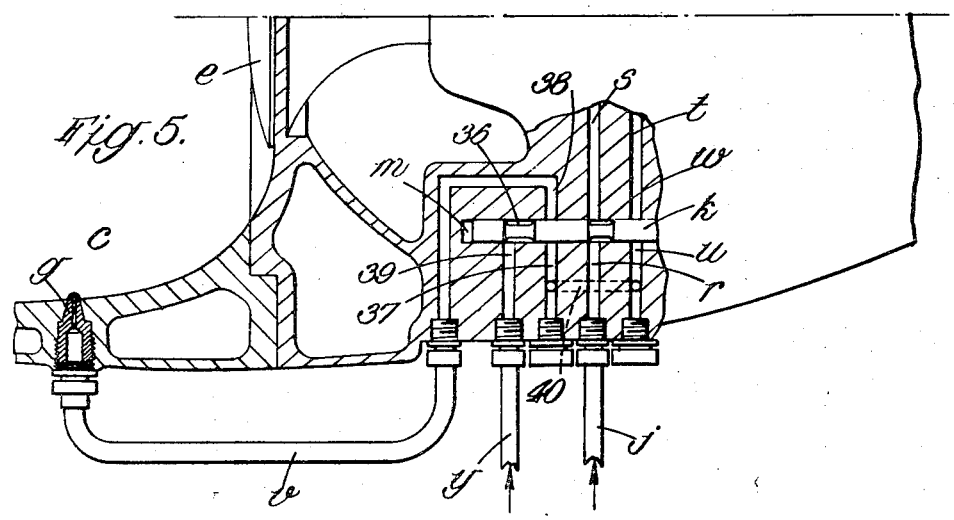
Figure 8:
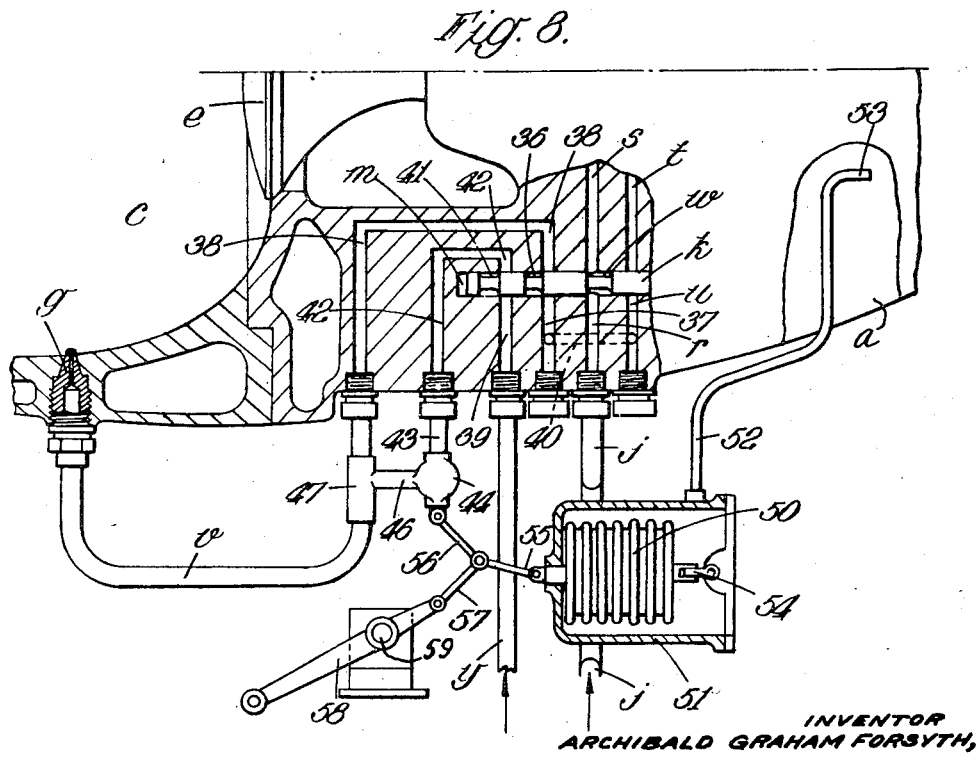
Figure 9:
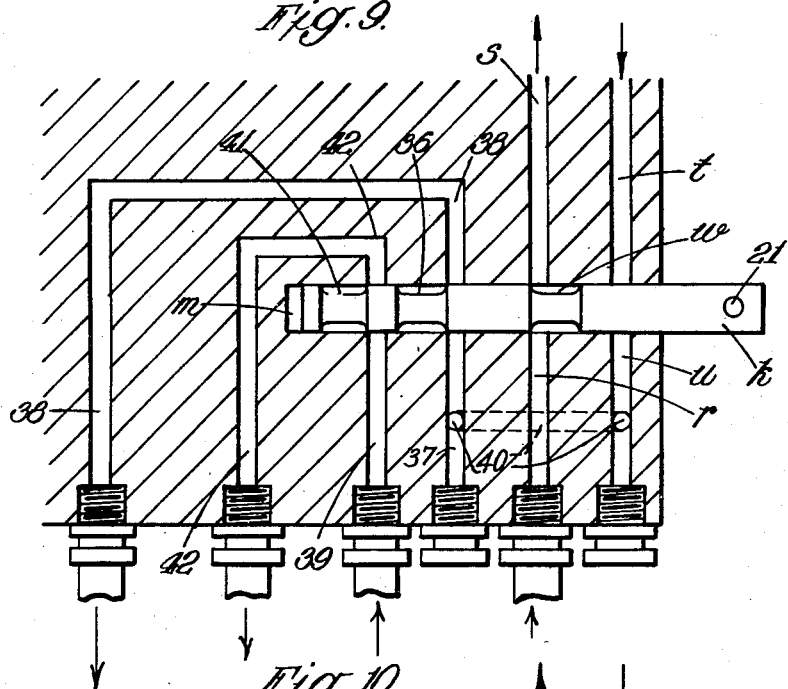
Figure 10:
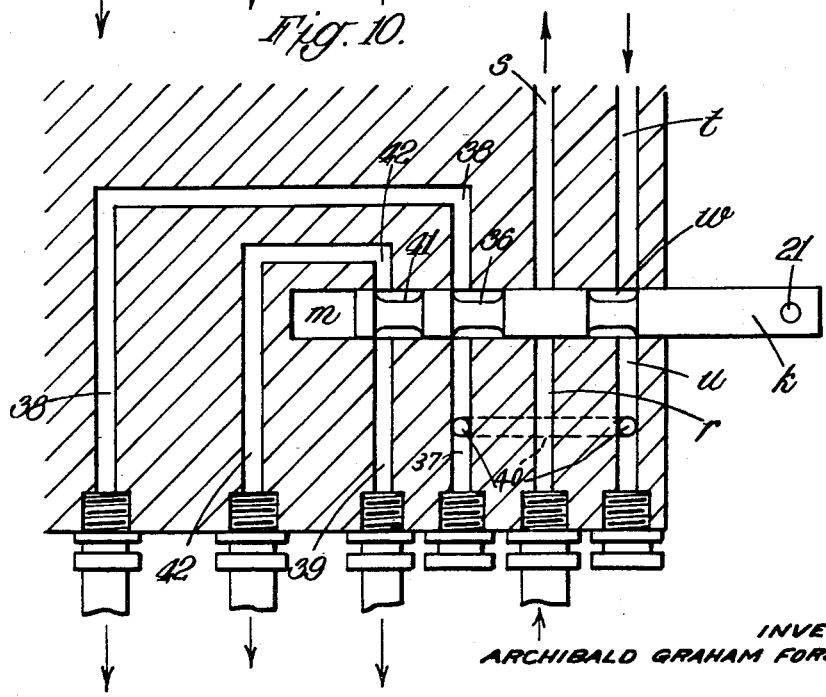
Figure 11:
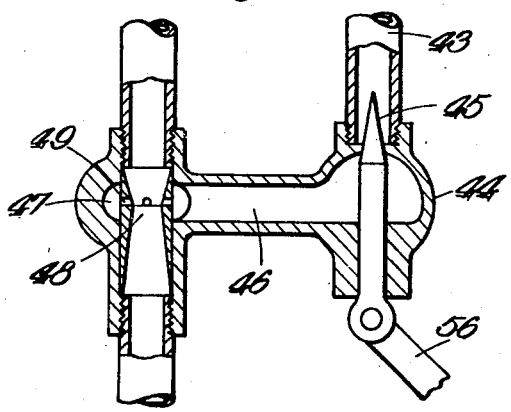
Figure 16:
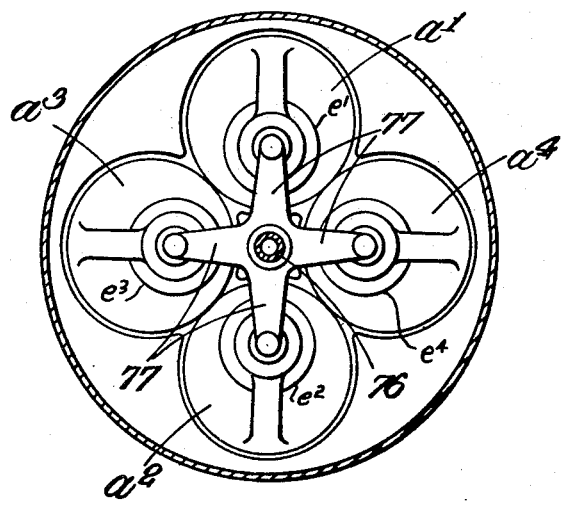

Other and further objects and advantages of this invention will become apparent as the following specification is read in the light of the accompanying drawings wherein:

Figure 1 is a sectional elevation of one form of internal combustion unit arranged in accordance with this invention; Figure 2 is a sectional view of the controlling valve thereof, drawn to an enlarged scale, and illustrating automatically operating means for reversing the valve; Figure 3 is a similar view showing the valve and its operating means in the reversed position; Figure 4 is a sectional view of a detail drawn to an enlarged scale; Figure 5 is a fragmentary sectional elevation illustrating a modification of the valve arrangement; Figures 6 and 7 are sectional views of the controlling valve thereof, drawn to an enlarged scale and shown in its two operative positions, respectively; Figures 8, 9 and 10 correspond with Figures 5, 6 and 7, respectively, but illustrate a further modification; Figure 11 is a sectional view of a detail thereof, drawn to an enlarged scale; Figure 12 is a sectional elevation corresponding with Figure 1 but illustrating a modification of the explosion chamber; Figures 12A and 12B correspond to Figure 12, and illustrate the position of the several elements when the valve is in its partially opened and completely opened position; Figures 13 and 14 illustrate a modification in which a single air intake chamber is associated with a plurality of explosion chambers each of which is separable from the air intake chamber by its appropriate main valve, Figure 13 being a fragmentary longitudinal sectional elevation and Figure 14 being a sectional end view on the line 14—14, of Figure 13; Figures 15 and 16 illustrate another modification in which a plurality of air intake chambers each having a main valve associated therewith leading to a single explosion chamber, Figure 15 being a longitudinal sectional elevation and Figure 16 being a sectional end view on the line 16—16, of Figure 15; Figure 17 is a longitudinal sectional elevation illustrating a further modification of the invention in which a plurality of units are grouped in a single casing; Figure 18 is a diagrammatic representation of one form of unit according to this invention arranged as a prime mover for an auxiliary mechanism on an aircraft; Figure 19 is a longitudinal sectional elevation showing a modified form of explosion chamber and modified fuel injection means; Figure 20 is a similar view to Figure 19 but illustrates a modification of the air intake means; Figure 21 is a fragmentary sectional elevation corresponding with Figure 20 illustrating means for controlling the admission of air to the units of a group in a predetermined sequence; Figure 22 is a fragmentary sectional elevation illustrating modified means for actuating a plurality of main valves simultaneously; Figures 23 and 24 are diagrammatic side elevations showing two arrangements of groups of units in accordance with this invention as applied to an otherwise standard aircraft; while Figures 25, 26 and 27 show how units according to the invention may be arranged in the wing of an aircraft, Figure 25 being a diagrammatic sectional elevation on a fore and aft plane of an aircraft wing, Figure 26 a fragmentary diagrammatic sectional plan and Figure 27 a fragmentary diagrammatic front elevation; Figure 28 is a cross section taken on the lines 28—28 of Figure 1; and Figure 29 is a cross section taken on the lines 29—29 of Figure 1, looking in the direction of the arrows.

As shown in Figure 1 the unit consists of a forwardly opening or air intake chamber $a$, water jacketed as at $b$, a rearwardly opening or explosion chamber $c$, water jacketed as at $d$, the chambers $a$ and $c$ being shaped conjointly to constitute a Venturi tube at the throat of which is a valve $e$ by which the intake chamber $a$ is separable from the explosion chamber $c$. As shown the air intake chamber $a$ is of less diameter at its leading end than at its mid portion (see Figure 28) and is contracted again towards its rear end, while the explosion chamber $c$ has a restricted outlet at $f$. The reference letter $g$ indicates a nozzle through which a jet of liquid fuel may be injected into the explosion chamber $c$ and $h$ is a spark plug for igniting the explosive mixture. In order periodically to open the valve $e$ to admit air from the intake chamber $a$ to the explosion chamber $c$, to inject liquid fuel into the explosion chamber, and to fire the explosive mixture in the chamber $a$, compressed air is supplied by a pipe $j$ from a suitable source (not shown) and its flow is controlled by an automatically operating piston valve $k$ slidable in a valve cylinder $m$ in a boss $n$ situated in the air intake chamber $a$.

The valve $e$ between the air intake and explosion chambers $a$ and $c$ is sodium filled (see reference character $e^0$) for cooling purposes and is opened automatically against the action of a coiled spring $o$ by compressed air admitted from the pipe $j$ to a cylinder $p$ in the boss $n$, the stem of the valve $e$ being furnished with a piston $q$ which is slidable in the cylinder $p$ and constitutes an abutment for one end of the spring $o$, the other end of which abuts against a wall at the end of a recess in the boss $n$ in which it is housed. In the boss $n$ are two pairs of ports $rs$ and $tu$ (see also Figures 2 and 3) leading from the valve cylinder $m$, of which the ports $r$ and $s$ are opposite one another and are connected with the compressed air supply pipe $j$ and the cylinder $p$ respectively, and of which the ports $tu$ are opposite one another and are connected, respectively, with the cylinder $p$ and with a pipe $v$ leading to the fuel injection nozzle $g$, while the piston valve $k$ has a peripheral groove $w$ by which, according to the position of the piston valve $k$, the ports $r$ and $s$ are put in communication with one another, as shown in Figure 2, and hence, as compressed air is admitted from the pipe $j$ to the cylinder $p$, the piston $q$ will be moved against the action of its spring $o$ and opens the valve $e$ between the air intake and explosion chambers $a$ and $c$, or, alternatively, as shown in Figure 3, when the ports $t$ and $u$ are put into communication with one another, and hence the valve $e$ is closed and air is the cylinder $p$ is exhausted therefrom under the influence of the spring $o$ and the piston $q$ which drives the air into the pipe $v$. Actually, the air thus exhausted from the cylinder $p$ is still under pressure, though reduced, and may be used for fuel injection purposes. To this end, as shown in Figure 4, part of the pipe $v$ is surrounded by a chamber $x$ to which leads a fuel supply pipe $y$, and the pipe $v$ is formed as a Venturi tube at that part thereof which is surrounded by the chamber $x$ and has radial openings $z$ by which the chamber $x$ communicates with the Venturi tube, hence, when the peripheral groove $w$ of the piston valve $k$ establishes communication between the ports $t$ and $u$, as shown in Figure 3, air under pressure flows along the pipe $v$ sucking up fuel as it passes through said Venturi tube, and injects a jet of fuel through the nozzle $g$ into the explosion chamber $c$.

In order that compressed air may be admitted to, and exhausted from, the cylinder $p$ to open the valve $e$ and to allow it to be closed by its spring $o$ a cross pin 21 on the piston valve $k$ is engaged by the bifurcated end of a lever 22 pivoted at 23 on a lug 24 on the boss $n$ and the end of the lever remote from the bifurcation is formed with an arcuate slot 25. On the lug 24 on the boss $n$ a second lever 26 is pivoted at 27, the pivot pin 27 passing through the arcuate slot 25 of the lever 22, and the upper end of the lever 26 is bifurcated to engage a cross pin 28 on an extension 29 of the stem of the valve $e$, while the lower end of the lever 26 is connected with the lower part of the lever 22 by a tension spring 30.

When the valve $k$ is in the position shown in Figure 2 compressed air is admitted from the pipe $j$ to the cylinder $p$ and the valve $e$ is opened; the opening of the valve $e$ moves the cross pin 28 to the left, from the position shown in Figure 2 to the position shown in Figure 3, thus swinging the lever 26 about its pivot 27, relaxing the tension of the spring 30 until after the lever 26 has passed through its dead centre position, whereupon the spring 30 is again stressed and, when sufficiently tensioned, acts on the lever 22 and turns the latter about its pivot 23 from the position shown in Figure 2 to the position shown in Figure 3, the extent of movement of the lever 22 being limited by the engagement of the pivot pin 27 in the arcuate slot 25. Thus the position of the valve $k$ is reversed and connection is established between the ports $tu$, compressed air is exhausted from the cylinder $p$ as the valve $e$ closes and fuel is injected into the explosion chamber $c$ as set forth above.

In the path of the extension 29 of the stem of the valve $e$ is a movable switch blade 31 which, at the moment when the valve $e$ seats itself, is forced against a fixed switch blade 32. The switch 31, 32 is arranged in the primary circuit 33 of an ignition coil 34, the secondary of which is connected as at 35 with the spark plug $h$.

The arrangement of the unit is such that in use, owing to the forward movement of the vehicle on which the unit is mounted, air pressure is built up in the air intake chamber $a$ when the valve $e$ is closed, a charge of air under pressure is admitted to the explosion chamber $c$ when the valve $e$ is opened, fuel is injected into the air in the explosion chamber $c$ and, when the valve $e$ is closed, the explosive mixture is fired and the discharge through the restricted outlet $f$ produces the propulsive effect.

Instead of sucking up and injecting fuel by the arrangement shown in Figure 4, the fuel to be injected may be metered so as to ensure that a predetermined quantity of fuel shall be employed for each explosion. For this purpose the piston valve $k$ and the fuel pipe arrangements are altered as shown in Figures 5, 6 and 7 where it will be seen that the piston valve $k$ is lengthened and is formed with a second peripheral groove 36, while the valve cylinder $m$ is formed with a third pair of oppositely arranged ports 37, 38, and with a single or seventh port 39, the peripheral groove 36, the ports 37, 38 and the port 39 being spaced on the piston valve $k$ and along its valve cylinder $m$ so that when the piston valve $k$ is in the position shown in Figure 6 to admit compressed air to the port $s$, and hence to the main valve cylinder $p$, the ports 37, 38 are closed, but the peripheral groove 36 is in register with the port 39. The port $u$ instead of being connected directly with the pipe $v$ as shown in Figure 1 is connected by a passage 40 with the port 37, the port 38 is connected with the pipe $v$ leading to the nozzle $g$ (see Figure 5) and the port 39 is connected with the pipe $y$ by which fuel is supplied under pressure. In consequence of this arrangement the peripheral groove 36 is filled with a predetermined quantity of fuel when the piston valve $k$ is in the position shown in Figure 6 and when said valve is moved to the position shown in Figure 7 (as described above with reference to Figures 2 and 3) to permit the escape of compressed air from the cylinder $p$, the port 39 is closed and the peripheral groove 36 is in register with the ports 37, 38, hence the compressed air which escapes from the cylinder $p$ as the valve $e$ is closed by its spring $o$ drives fuel from the peripheral groove 36 through the port 38, pipe $v$ and nozzle $g$ into the explosion chamber $c$.

Figures 8 to 11 illustrate a further modification of the form of the invention shown in Figures 5 to 7 and is designed for use when it is desired to co-ordinate the quantity of fuel supplied with the speed of the vehicle. As shown the piston valve $k$ is formed with a third peripheral groove 41 and its valve cylinder $m$ is formed with a port 42 opposite the port 39 (which is connected with the fuel supply pipe $y$), the port 42 being connected with a pipe 43 (Figures 8 and 11) in an enlargement 44 in which is situated a tapered needle valve 45 (Figure 11), the enlargement 44 leading by a pipe 46 to a chamber 47 surrounding part of the pipe $v$ which leads from the port 38 to the nozzle $g$. This part of the pipe $v$ is formed as a Venturi tube 48 and has radial openings 49 by which the chamber 47 communicates therewith. Hence, when the piston valve $k$ is in the position shown in Figure 9 there is no flow of fuel, but when the valve is in the position shown in Figure 10 compressed air from the cylinder $p$ is driven through the port $t$, the peripheral groove $w$, port $u$, passage 40, port 37, peripheral groove 36, port 38, the Venturi tube 48 and pipe $v$ to the nozzle $g$, while fuel from the pipe $y$ flows through the port 39, the peripheral groove 41, port 42, past the tapered needle valve 45, enlargement 44 and radial openings 49 to the Venturi tube 48 where it is sucked up by the flow of air therethrough and injected into the explosion chamber $c$ through the nozzle $g$.

The extent to which the tapered needle valve 45 opens is governed by a bellows device 50 according to the pressure in the air intake chamber $a$, for which purpose the bellows device 50 is arranged in a chamber 51 connected by a pipe 52 with a Pitot tube 53 which opens forwardly in the air intake chamber $a$, one end of said bellows device 50 being anchored as at 54 to the end of the chamber 51, while its other end is movable and connected by a link 55 with the central point of a toggle 56, 57, one limb, 56, of which is connected with the needle valve 45 and the other limb, 57, of which is connected with a throttle lever 58 pivoted at 59, the arrangement being such that, apart from any degree of opening imparted to the needle valve 45 by the throttle lever 58, increase of pressure in the air intake chamber $a$ compresses the bellows device 50 and actuates the tapered needle valve 45 to admit a greater quantity of fuel.

In the modification of the invention illustrated by Figure 12 the explosion chamber $c$ is shaped to constitute a Venturi tube at the throat of which is disposed a rearwardly opening spring influenced valve 60 to allow pressure to build up in the chamber $c$, and such valve, like the valve $e$, may be sodium filled (reference character $c^0$) for cooling purposes. In order that this valve 60 may be opened as a result of initial movement thereof which takes place when explosion occurs, after which the opening movement is completed positively, the ejection discharge taking place through the part $f$ of the Venturi tube explosion chamber in rear of the valve 60 and the valve being thereafter closed, the stem 61 of the valve has mounted thereon a piston 62 arranged in a cylinder 63 in the rear end of the unit and influenced by a spring 64 which tends, normally, to close the valve, while the cylinder 63 is connected by a pipe 65 with a source of fluid pressure, such as compressed air, under the control of an automatically acting piston valve 66 actuated by a lever 67 in a manner similar to that described above with reference to the actuation of the piston valve $k$ by the lever 22. The piston valve 66 is formed with a peripheral groove 68 and is bevelled at its outer end, as at 69, for a purpose to which reference will be made hereinafter, while a port 70 connects the cylinder 63 with the cylinder 71 of the piston valve 66 and a port 72 connects the cylinder 71 with the pipe 65.

When the explosion takes place in the forward part of the explosion chamber $c$ the valve 60 is forced back slightly against the action of its spring 64 carrying with it the piston 62 on its stem 61 to an extent sufficient partly to uncover the port 70. The piston valve 66, at this time, will be in the position shown in Figure 12, that is to say compressed air is admitted via the port 72 and peripheral groove 68 to the port 70, hence this pressure acting on the piston 62 in the cylinder 63 will bring about the opening of the valve 60 to its full extent, and at the end of the travel of the valve 60 the lever 67 will bring about, automatically, the reversal of the piston valve 66 shutting off the port 72 while its bevelled end 69 uncovers the port 70 and permits the escape of compressed air from the cylinder 63, thus allowing the spring 64 to re-seat the valve 60 and restore the piston 62 to its initial position. In this manner any possible inaccuracy in timing of the valve 60 is obviated.

In the modification of the invention illustrated by Figures 13 and 14, the air intake chamber $a$ is associated with a plurality (four are shown which are spaced substantially 90° apart) of explosion chambers part of two of which are indicated at $c^1$ and $c^2$ and each of these explosion chambers is separable from the common air intake chamber $a$ by its appropriate main valve such as $e^1$, $e^2$, and $e^3$ and $e^4$. The stems 73 of these main valves are slidable in guides such as 74 formed at the rear end of the air intake chamber $a$ and are urged towards their seats by springs 75, while they are opened, against the action of the springs, by means similar to those described above with reference to Figure 1 except that the stem of the valve $e$ shown in Figure 1 is replaced by a rod 76 (having an extension 29) at the rear end of which are radial arms 77 which bear, through adjustable tappets 78, against the front ends of the valve stems 73.

The modification illustrated by Figures 15 and 16 is similar to that described with reference to Figures 13 and 14 except that a plurality of air intake chambers $a^1$, $a^2$, $a^3$ and $a^4$ are associated with a single explosion chamber $c$. The air intake chambers $a^1$, $a^2$, $a^3$ and $a^4$ have their appropriate spring influenced main valves such as $e^1$, $e^2$, $e^3$ and $e^4$ actuated through adjustable tappets 78 on radial arms 77 carried by a rod 76.

Figure 17 illustrates another modification of the invention in which a plurality of units are grouped as a single compound unit; that is to say, four air intake chambers, such as $a^1$, $a^2$, as in Figures 15 and 16, are associated with four explosion chambers, such as $c^1$, $c^2$, as in Figures 13 and 14 and the air intake chambers are separable from their respective explosion chambers by appropriate main valves, such as $e^1$, $e^2$ arranged and operated as set forth above with reference to Figures 13 and 14. Figure 17 also shows that, as will be understood, each explosion chamber $c^1$ (whether as shown in Figures 13 and 14 or in Figure 17) has its appropriate fuel nozzle $g$ and spark plug $h$ arranged to bring about simultaneous explosions in the chambers, and that the chambers may have individual discharge passages $f^1$, $f^2$ as indicated.

Figure 18 illustrates diagrammatically how a unit in accordance with this invention may be employed not only for the propulsion of the vehicle itself but also as a prime mover for one or more auxiliaries such as an electric generator, an air compressor, a fuel compressor and so on.

In Figure 18 U represents the unit and 79 an auxiliary, such as an electric generator, on the shaft 80 of which is a turbine wheel 81. The discharge passage $f$ from the Venturi shaped explosion chamber $c$ of the unit U is fanned out and is provided with a plurality of suitably inclined fixed vanes 82 for directing the gases to the blades 83 of the turbine wheel 81 and 84 is a collector for the exhaust from the turbine wheel 81.

This figure also shows how steam from the water jackets $b$ and $d$ (Figure 1) may be led by a pipe 85 to a steam separator 86 and thence by a pipe 87 to a steam turbine 88, the rotor (not shown) of which is on the shaft 89 of an auxiliary 90, such as an air or fuel compressor. The reference numeral 91 indicates the inlet to the water jackets $bd$.

Figure 19 shows an explosion chamber $c$ shaped to constitute a Venturi tube and having, aft of its throat, a streamlined centre piece 92 carried by a spider 93. This form of explosion chamber may be employed, where applicable, in any of the units of the preceding forms of the invention. This figure illustrates how the fuel injection means may be modified to bring about also the injection of water into the explosion chamber $c$ to be introduced into the explosive mixture.

For example the piston valve $k$ is arranged as set forth above with reference to Figures 5, 6 and 7 except that the port 39, instead of being connected with the fuel supply pipe $y$, is connected with a water supply pipe 94 and the port 38, instead of being connected with the pipe $v$ leads to a nozzle 95 at the front end of the explosion chamber $c$ and through which water is injected thereinto, the pipe $v$ being connected with the port $u$ and fuel being supplied through the pipe $y$ as described above with reference to Figures 1 to 3. It will be observed that in this case the compressed air from the cylinder $p$ passes not only to the pipe $v$ but also by way of the passage 40 to the port 37 to force water in the peripheral groove 36 through the port 38 to the nozzle 95.

This figure also illustrates how a nose piece 96 carried by an arm 97 pivoted at 98 may be provided to close and thereby streamline the leading end of a unit when it is not in use, the nose piece 96, when in the closed position, constituting a continuation of the surface of the unit.

In the form of the invention shown in Figure 20 a plurality of units similar, in general, to those described above are grouped around the shaft 99 of a turbine 100. The turbine 100 drives the rotor 101 of a multi-stage centrifugal supercharger indicated generally at 102 and having an intake pipe 103 in which is a butterfly valve 104, the output of the supercharger 102 being delivered to a volute 105 which replaces the several air intake chambers of the units, each of which has its individual main explosion chamber $c$, main valve $e$ and associated parts. Some of the units grouped around the turbine shaft 99 act as ejectors for propulsive purposes, in which event their restricted outlets $f$ are arranged as shown at the bottom of the right hand side of Figure 20, and are continued as indicated at 106, while others of the units are used for driving the turbine 100, in which event their restricted outlets $f$ are arranged as shown at the top of the right hand side of Figure 20, the exhaust from the turbine 100 being carried away by pipes such as 107, 107 which lead to a common outlet 108 in rear of the outlets such as 106.

The common outlet 108 may be in the form of, or lead to, a Venturi tube at the tail of an aircraft, and the outlets such as 106 may be grouped around the tail but further forward than the common outlet 108.

At the forward end of the turbine shaft 99 is a gear wheel 109 meshing with another gear wheel 110 on a lay shaft 111 on which are bevel wheels 112 and 113 in a gear box 114. The bevel wheel 112 meshes with a bevel wheel 115 on the spindle of an electric motor 116 and the bevel wheel 113 meshes with bevel wheels 117 and 118, of which the bevel wheel 117 is on the spindle of a fuel pump 119 and the bevel wheel 118 is on the spindle of an air compressor 120. 121 is an electric battery and 122 an induction coil for the spark plugs $h$ of the units.

The further modification illustrated by Figure 21 corresponds with the form of the invention just described with reference to Figure 20, but includes means for causing the main valves $e$ to open in a predetermined sequence. For this purpose the output of the air compressor 120 is led by a pipe 123 to a compressed air distributor chamber 124 in which is a rotor 125, the shaft 126 which is driven by a bevel wheel 127 meshing with the bevel wheel 112, the rotor 125 being formed with a port 128 through which compressed air passes to a series of compressed air pipes 129 leading to the piston valve mechanisms of the several units, the pipes 129 being arranged in a circular series and in the desired predetermined order under the rotor 125 so that as the port 128 passes thereover compressed air will be admitted thereto to bring about the opening of the main valves $e$ in the desired predetermined sequence.

The sparking plugs $h$ are connected with appropriate coils shown collectively at 122.

The central zone of the turbine rotor 100 may be sodium filled (this applies also to the turbine rotor 100 shown in Figure 20) and further as much as possible of the rotor may be air cooled by tappings such as 130 from the compressed air volute 105.

In the modification of the invention illustrated by Figure 22, 105 is a volute which replaces the several air intake chambers of a group of units as in Figure 20, the output of the multi-stage supercharger 102 being delivered to the volute 105. In this case the stem 131 of each main valve $e$ passes through a guide 132 formed in the wall of the volute 105 and is influenced by a spring 133 to close the valve. On the wall of the supercharger 102 guides such as 134 are provided for tappet rods such as 135 for the valve stems 131 and against the opposite ends of these tappet rods 135 bear adjustable tappets 78 on radial arms 77 carried by a rod 76 having a piston $q$ in a cylinder $p$ and an extension 29, the automatic reversal of the piston q in its cylinder p being effected as hereinbefore set forth with reference to Figure 1, the flow of compressed air serving also for the injection of fuel into the explosion chambers of the several units. Although this arrangement is shown as applied to a particular form of the invention, it is to be understood that these means for operating the main valves such as e may be applied to other cases where a plurality of units are grouped about a common axis.

Figure 23 shows diagrammatically how a group of units according to this invention and indicated generally as U may be mounted beneath an otherwise standard aircraft indicated generally as A, the airscrew 136 of which will serve to charge the air intake chambers of the several units.

In Figure 24 is shown an alternative arrangement where a plurality of units, indicated generally as U, are grouped about the tail of an otherwise standard aircraft, indicated generally at A, and a tapping 137 (or a plurality of such tappings) from the main supercharger 138 of the aircraft A leads to the air intake chambers of the units. The explosion chambers of the units may have grouped discharge passages as shown at 139.

In addition to the groupings of units hereinbefore set forth such units may be arranged in other convenient manners, as for example, around the fuselage of the aircraft and/or along the wings and such units may be covered by a fairing formed with forward and rearward openings. Figures 25, 26 and 27 of the accompanying drawings illustrate an arrangement of units indicated as U within the wing 141 of an aircraft A. Reference numerals 142 indicate inlets running from the leading edge of the wing to the air intake chambers of the several units U, and 143 are prolongations of the restricted outlets from the explosion chambers of the units. In Figure 26 144 represents a supercharger or other suitable air supply and 145 a fuel supply to the units while 146 is a battery and 147 is an induction coil for the sparking plugs of the units.

I claim:

1. A propulsive unit for aircraft or other vehicles comprising a forwardly opening air intake chamber and a rearwardly opening explosion chamber, and valve means affording communication between said chambers, and periodically operating means for injecting fuel into the explosion chamber, valve operating means admitting air from the air intake chamber to said explosion chamber, means for firing the explosive mixture in said explosion chamber, said chambers being shaped conjointly to constitute a Venturi tube with said valve situated at its throat, and a cylinder disposed in said air intake chamber, said valve being provided with a valve stem slidably mounted in said cylinder, a piston mounted on one end of said stem and being disposed within said cylinder, resilient means disposed within said cylinder, said resilient means adapted to maintain said valve in closed position, a plurality of fluid conduits having one of their ends terminating in said cylinder, at least one of said fluid conduits having its other end connected with a source of fluid under pressure, at least one of the remaining conduits comprising a fluid exhaust conduit, and second valve means alternately connecting said cylinder with said fluid source and exhaust conduit.

2. A propulsive unit for aircraft or other vehicles as defined in claim 1, said piston being adapted to move said first valve to its open position under the fluid force acting thereon, and said resilient means being adapted to close said valve upon connection of said cylinder with said exhaust conduit.

3. A propulsive unit for aircraft or other vehicles comprising a forwardly opening air intake chamber and a rearwardly opening explosion chamber, and valve means affording communication between said chambers, and periodically operating means for injecting fuel into the explosion chamber, valve operating means admitting air from the air intake chamber to said explosion chamber, means for firing the explosive mixture in said explosion chamber, said chambers being shaped conjointly to constitute a Venturi tube with said valve situated at its throat, and a valve actuating cylinder disposed in said air intake chamber, said valve being provided with a valve stem slidably mounted in said valve actuating cylinder, a piston mounted on one end of said stem and being disposed within said valve actuating cylinder, resilient means disposed within said valve actuating cylinder, said resilient means adapted to maintain said valve in closed position, a plurality of fluid conduits having one of their ends terminating in said valve actuating cylinder, at least one of said fluid conduits having its other end connected with a source of fluid under pressure, at least one of the remaining conduits comprising a fluid exhaust conduit, and control means disposed in said fluid conduits and comprising a valve cylinder, and second valve means alternately connecting said valve actuating cylinder with said fluid source and exhaust conduit, said second valve means comprising a piston valve, said piston valve having a peripheral groove formed thereon and being slidable from one position to another in said valve cylinder, said valve cylinder being provided with two pairs of oppositely disposed ports, valve operating means adapted to move said valve piston to alternative positions of the piston valve whereby said grooved portion establishes communication between the oppositely disposed ports of the respective pairs, one port of each pair communicating with said valve actuating cylinder, said second port of one of said pairs being connected with the source of fluid under pressure, the second port of the other of said pairs comprising an exhaust port, said exhaust port being connected with said means for injecting fuel into said unit.

4. A propulsive unit for aircraft or other vehicles as defined in claim 3, said exhaust port being connected with a pipe leading to said means for injecting fuel into the explosion chamber, said fuel injection means being disposed within said explosion chamber, and a part of said pipe being formed as a Venturi tube, a chamber surrounding said Venturi tube, openings in said Venturi tube communicating with said chamber, and said chamber being connected with the source of fuel supply.

5. A propulsive unit for aircraft or other vehicles as defined in claim 3, wherein said piston valve is formed with a second peripheral groove and its valve cylinder is formed with a third pair of oppositely disposed ports and with a single or seventh port, one port of each of the second and third pairs being interconnected, said second peripheral groove, said third pair of ports, and said seventh port being spaced on the piston valve and along its valve cylinder so that when the piston valve is in position to establish communication between the first pair of ports to admit fluid under pressure to said cylinder, communication between the second pair of ports and between the third pair of ports is cut off, and the second peripheral groove is in communication with the single or seventh port which is connected with the source of fuel supply, said second peripheral groove thereby serving as a metering chamber, while, when said piston valve is in position to cut off communication between the first pair of ports, the seventh port is closed, communication between the second pair of ports and between the third pair of ports is established and compressed fluid from the main valve operating cylinder drives out the fuel in the second peripheral groove and injects it into said unit.

6. A propulsive unit for aircraft or other vehicles as defined in claim 3, wherein said piston valve is formed with a second peripheral groove and its valve cylinder is formed with a third pair of oppositely disposed ports and with a single or seventh port, one port of each of the second and third pairs being interconnected, said second peripheral groove, said third pair of ports, and said seventh port being spaced on the piston valve and along its valve cylinder so that when the piston valve is in position to establish communication between the first pair of ports to admit fluid under pressure to said cylinder, communication between the second pair of ports and between the third pair of ports is cut off, and the second peripheral groove is in communication with the single or seventh port which is connected with a source of fuel supply, said second peripheral groove thereby serving as a metering chamber, while, when said piston valve is in position to cut off communication between the first pair of ports, the seventh port is closed, communication between the second pair of ports and between the third pair of ports is established and compressed fluid from the main valve operating cylinder drives out the fuel in the second peripheral groove and injects it into said unit.

7. A propulsive unit for an aircraft or other vehicle, as claimed in claim 3, said piston valve is formed with a third peripheral groove and said valve cylinder is formed with a fourth pair of oppositely arranged ports, a fuel line connected with said fourth pair of ports, a tapered needle valve being disposed in said fuel line, a pressure responsive device actuated by variations in air pressure in said air chamber, said pressure responsive device comprising means for actuating said needle valve in order that the quantity of fuel supplied may be co-ordinated with the speed of the vehicle.

8. A propulsive unit for aircraft or other vehicles comprising a forwardly opening air intake chamber and a rearwardly opening explosion chamber, and valve means affording communication between said chamber, and periodically operating means for injecting fuel into the explosion chamber, valve operating means admitting air from the air intake chamber to said explosion chamber, means for firing the explosive mixture in said explosion chamber, said chambers being shaped conjointly to constitute a Venturi tube with said valve situated at its throat, and a valve actuating cylinder disposed in said air intake chamber, said valve being provided with a valve stem slidably mounted in said valve actuating cylinder, a piston mounted on one end of said stem and being disposed within said valve actuating cylinder, resilient means disposed within said valve actuating cylinder, said resilient means adapted to maintain said valve in closed position, a plurality of fluid conduits having one of their ends terminating in said valve actuating cylinder, at least one of said fluid conduits having its other end connected with a source of fluid under pressure, at least one of the remaining conduits comprising a fluid exhaust conduit, and control means disposed in said fluid circuits and comprising a second valve means alternately connecting said valve actuating cylinder with said fluid source and exhaust conduit, said second valve comprising a piston valve and a valve cylinder therefor, said valve having a peripheral groove formed thereon and being slidable from one position to another in said valve cylinder, said valve cylinder being provided with two pairs of oppositely disposed ports, valve operating means adapted to move said piston valve to alternative positions whereby the peripheral groove establishes communication between the oppositely disposed ports of the respective pairs, one port of each pair communicating with said valve actuating cylinder, said second port of one of said pairs being connected with the source of fluid under pressure, the second port of the other of said pairs comprising an exhaust port, said exhaust port being connected with said means for injecting fuel into said unit, said piston valve being formed with a second peripheral groove and said valve cylinder being formed with a third pair of oppositely arranged ports, means for connecting a source of fuel supply with one port of said third pair, a tapered needle valve being arranged in the fuel line, a pressure responsive device disposed in said air intake chamber, said needle valve being governed by said pressure responsive device according to the pressure in said fluid intake chamber, in order that the quantity of fuel supplied may be co-ordinated with the speed of the vehicle, said tapered needle valve being situated in an enlargement of the fuel line, means connecting said enlargement with a chamber, a pipe disposed between the fuel injection means and one of the ports of the third pair of ports, said chamber surrounding said pipe, said pipe being formed as a Venturi tube at that part thereof which is surrounded by said chamber and having lateral openings by which said chamber communicates with said Venturi tube.

9. A propulsive unit for an aircraft or other vehicle, as claimed in claim 8, wherein the bellows device is situated in a chamber connected with a Pilot tube situated in the air intake chamber, one end of said bellows device being fixed and the other end thereof being movable, a toggle member, said movable end being connected with the central point of said toggle, one limb of said toggle being connected with said needle valve and the other end of which is connected with a throttle lever.

10. A propulsive unit for an aircraft or other vehicle, as claimed in claim 3, a first lever and a second lever, the piston valve being reversed by said first lever which is oscillated about its pivot to a limited extent by said second lever which is itself oscillated about its pivot by engagement with a part of the main valve between the air intake and explosion chambers, a tension spring connecting said first and said second levers whereby after said second lever has passed through a dead center position, said tension spring is stressed and causes the first lever suddenly to follow the movement of said second lever.

11. A propulsive unit for an aircraft or other vehicle, as claimed in claim 3, a turbine wheel, and means connecting said explosion chamber discharge products to said turbine wheel for driving an auxiliary.

12. The propulsive unit for an aircraft or other vehicle, as claimed in claim 1, whereby said second valve is in the form of a piston valve, a valve cylinder, said piston valve having a peripheral groove formed therein and being slidable from one position to another in said valve cylinder, said valve cylinder being provided with two pairs of oppositely disposed ports, valve operating means adapted to move the grooved portion of said piston to alternative positions in said valve cylinder, thereby establishing by means of said peripheral groove communication between the oppositely disposed ports of the respective pairs, one port of each pair communicating with said cylinder, said second port of one of said pairs being connected with the source of fluid under pressure, and the second port of the other of said pairs comprising an exhaust port.

ARCHIBALD GRAHAM FORSYTH.

REFERENCES CITED

The following references are of record in the file of this patent:

UNITED STATES PATENTS

| Number | Name | Date |
|---|---|---|
| 877,194 | Holzwarth | Jan. 21, 1908 |
| 1,021,521 | Heroult | Mar. 26, 1912 |
| 1,731,778 | Holzwarth | Oct. 15, 1929 |
| 1,802,469 | Hofmann | Apr. 28, 1931 |
| 1,980,266 | Goddard | Nov. 13, 1934 |
| 2,024,274 | Campini | Dec. 17, 1935 |
| 2,124,462 | Cummings | July 19, 1938 |
| 2,142,601 | Bleecker | Jan. 3, 1939 |

FOREIGN PATENTS

| Number | Country | Date |
|---|---|---|
| 636,026 | France | Jan. 6, 1928 |
| 596,856 | Germany | May 11, 1934 |
| 640,228 | Germany | Dec. 28, 1936 |